US011388548B2

United States Patent
(12) United States Patent
Wirola et al.

(10) Patent No.: US 11,388,548 B2
(45) Date of Patent: Jul. 12, 2022

(54) DETERMINING OR ADJUSTING A GEOFENCE

(71) Applicant: HERE Global B.V., Eindhoven (NL)

(72) Inventors: Lauri Wirola, Tampere (FI); Petri Rauhala, Tampere (FI); Marko Luomi, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/982,440

(22) PCT Filed: Mar. 21, 2018

(86) PCT No.: PCT/EP2018/057196

§ 371 (c)(1),
(2) Date: Sep. 18, 2020

(87) PCT Pub. No.: WO2019/179620

PCT Pub. Date: Sep. 26, 2019

(65) Prior Publication Data

US 2021/0058735 A1 Feb. 25, 2021

(51) Int. Cl.

| | |
|---|---|
| ***H04W 4/021*** | (2018.01) |
| ***H04W 4/029*** | (2018.01) |
| ***H04W 4/02*** | (2018.01) |

(52) U.S. Cl.

CPC .......... *H04W 4/022* (2013.01); *H04W 4/027* (2013.01); *H04W 4/029* (2018.02)

(58) Field of Classification Search

CPC ...... H04W 4/022; H04W 4/029; H04W 4/027

See application file for complete search history.

(56) References Cited

U.S. PATENT DOCUMENTS

| | | | | |
|---|---|---|---|---|
| 8,471,701 | B2 | 6/2013 | Yariv et al. | |
| 8,924,147 | B2 | 12/2014 | Vellaikal et al. | |
| 8,941,489 | B2 | 1/2015 | Sheshadri et al. | |
| 2011/0153143 | A1 | 6/2011 | O'Neil et al. | |
| 2013/0178233 | A1* | 7/2013 | McCoy | H04W 4/027 455/456.3 |
| 2013/0324160 | A1 | 12/2013 | Sabatellil et al. | |
| 2014/0172531 | A1* | 6/2014 | Liberty | G06Q 20/3276 705/14.23 |
| 2015/0141045 | A1 | 5/2015 | Qiu et al. | |
| 2016/0277897 | A1* | 9/2016 | Wu | G01S 19/34 |
| 2017/0289757 | A1 | 10/2017 | Kong et al. | |
| 2018/0007149 | A1* | 1/2018 | Gauglitz | H04L 67/18 |

FOREIGN PATENT DOCUMENTS

WO WO-2017/125737 A1 7/2017

OTHER PUBLICATIONS

International Search Report and Written Opinion for Application No. PCT/EP2018/057196 dated Nov. 13, 2018, 15 pages.

* cited by examiner

*Primary Examiner* — Ernest G Tacsik

(74) *Attorney, Agent, or Firm* — Alston & Bird LLP

(57) ABSTRACT

It is inter-alia disclosed a method performed by an apparatus, said method comprising: determining a representative of a size of a geofence based on one or more parameters, wherein at least one parameter of the one or more parameters is indicative of a location update interval associated with a mobile device.

18 Claims, 8 Drawing Sheets

DETERMINING OR ADJUSTING A GEOFENCE

CROSS-REFERENCE TO RELATED APPLICATIONS

This application is a national phase entry of International Application No. PCT/EP2018/057196, filed Mar. 21, 2018, the entire contents of which are incorporated herein by reference.

FIELD OF THE DISCLOSURE

The invention relates to the field of geofences, and in particular to determining a size of a geofence.

BACKGROUND

The number of devices with location capabilities is expected to grow exponentially in the next decade or so. This growth is the result of the Internet-of-Things-era (IoT), in which more and more devices get connected to the Internet. Soon homes, factories, cities and transportation means will be equipped with low-cost sensors that produce real-time information on various characteristics and environment variables. Moreover, the cheaper electronics enables factories and industries to equip assets and supply chains with trackers that provide real-time information on the flow of goods.

The basic ingredient of the IoT story is that the sensors and trackers are location aware. The location-awareness can be achieved through two means: either the device has its own positioning capabilities (like GNSS or cell/wifi/Bluetooth offline positioning) or the device makes measurements of the radio environment (cell/wifi/Bluetooth) and sends them to the cloud for position determination.

When it comes to small devices that must function autonomously for extended periods of time, power consumption is of special concern. The devices are powered by batteries and, thus, any means to reduce current drain are welcome. For this reason the interval that the device calculates its location is often long, varying from tens of minutes to several hours. Location is important not only for simple tracking use cases, but also for event notifications. Specifically, when events are tied to geographical constraints, one talks about geofences. A geofence may, for example, be a circular area. When the device enters the defined area, an observer gets notified about the event.

SUMMARY OF SOME EMBODIMENTS OF THE INVENTION

According to an exemplary aspect of the invention, a method performed by an apparatus is disclosed, wherein the method comprises: determining a representative of a size of a geofence based on one or more parameters, wherein at least one parameter of the one or more parameters is indicative of a location update interval associated with a mobile device.

This method may for instance be performed and/or controlled by an apparatus, for instance a by a mobile device and/or a server.

According to a further exemplary aspect of the invention, a computer program is disclosed, the computer program when executed by a processor causing an apparatus to perform and/or control the actions of the method according to the exemplary aspect of the invention.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus (e.g. the first apparatus) is disclosed, configured to perform and/or control or comprising respective means for performing and/or controlling the method according to the exemplary aspect of the present invention.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the exemplary aspect of the present invention.

The above-disclosed apparatus according to any aspect of the invention may be a module or a component for a device, for example a chip. Alternatively, the disclosed apparatus according to any aspect of the invention may be a device, for instance a gateway device. The disclosed apparatus according to any aspect of the invention may comprise only the disclosed components, for instance means, processor, memory, or may further comprise one or more additional components.

In the following, exemplary features and exemplary embodiments of all aspects of the present invention will be described in further detail.

According to an exemplary embodiment of all aspects of the present invention, said determining a representative of a size of a geofence comprises at least one of:

- determining a large size in case that the at least one parameter indicative of a location update interval indicates a long location update interval;
- determining a small size in case that the at least one parameter indicative of a location update interval indicates a short location update interval;
- determining a larger size in case that the at least one parameter indicative of a location update interval indicates a longer location update interval as compared to when the at least one parameter indicative of a location update interval indicates a shorter location update interval; and
- determining a smaller size in case that the at least one parameter indicative of a location update interval indicates a shorter location update interval as compared to when the at least one parameter indicative of a location update interval indicates a longer location update interval.

According to an exemplary embodiment of all aspects of the present invention, said determining a representative of a size of a geofence is based on a function, wherein the location update interval indicated by the at least one parameter indicative of a location update interval is an input to this function and wherein the size of the geofence is an output of this function, and wherein, at least in a predefined range, the function is monotonically increasing with respect to the location update interval as input.

According to an exemplary embodiment of all aspects of the present invention, the one or more parameters are a plurality of parameters, and wherein at least one parameter of the plurality of parameters is indicative of a direction of movement associated with the mobile device.

According to an exemplary embodiment of all aspects of the present invention, said determined representative of a size of the geofence is representative of a size of the geofence in a direction which is substantially the same as the direction of movement associated with the mobile device indicated by the respect at least one parameter of the plurality of parameters.

According to an exemplary embodiment of all aspects of the present invention, the one or more parameters are a plurality of parameters, and wherein at least one parameter of the plurality of parameters is indicative of the position of the mobile device.

According to an exemplary embodiment of all aspects of the present invention, said determined representative of a size of the geofence is representative of a size of the geofence in a direction between the geofence and the position of mobile device indicated by the at least one parameter being indicative of the position of the mobile device.

According to an exemplary embodiment of all aspects of the present invention, it is comprised to change or modify a shape associated with the geofence compared to a shape associated with a reference geofence (or a previous geofence).

According to an exemplary embodiment of all aspects of the present invention, it is comprised to maintain shape associated with the geofence compared to a shape associated with a reference geofence (or a previous geofence).

According to an exemplary embodiment of all aspects of the present invention, said reference geofence and/or the previous geofence is obtained based on a user input.

Furthermore, as an example, the geofence for which a representative of a size is determined may be associated with a same area-of interest as the previous geofence or the reference geofence.

According to an exemplary embodiment of all aspects of the present invention, said one or more parameters comprise at least one parameter being indicative of a speed of the mobile device.

According to an exemplary embodiment of all aspects of the present invention, said determining a representative of a size of a geofence comprises at least one of:

determining a larger size in case that the at least one parameter indicative of a location update interval indicates a longer location update interval as compared to when the at least one parameter indicative of a location update interval indicates a shorter location update interval, determining a smaller size in case that the at least one parameter indicative of a location update interval indicates a shorter location update interval as compared to when the at least one parameter indicative of a location update interval indicates a longer location update interval, determining a larger size in case that the at least one parameter indicative of a speed of the mobile device indicates a faster speed as compared to when the at least one parameter indicative of a speed of the mobile device indicates a slower speed, and determining a smaller size in case that the at least one parameter indicative of a speed of the mobile device indicates a slower speed as compared to when the at least one parameter indicative of a speed of the mobile device indicates a higher speed.

According to an exemplary embodiment of all aspects of the present invention, said determining a representative of a size is based on a function, wherein the location update interval indicated by the at least one parameter indicative of a location update interval is an input to this function and the speed of the mobile device indicated by the at least one parameter indicative of a speed of the mobile device is an input to this function, wherein the size of the geofence is an output of this function, and wherein, at least in a predefined range:

the function is monotonically increasing with respect to the location update interval as input if the speed as input is kept constant, and the function is monotonically increasing with respect to the speed as input if the location updated interval is kept constant.

According to an exemplary embodiment of all aspects of the present invention, said determining a representative of a size is based on a function, wherein an input parameter is an input to this function, wherein the size of the geofence is an output of this function, and wherein the input parameter is determined based on the location update interval indicated by the at least one parameter indicative of a location update interval is an input to this function and based on the speed of the mobile device indicated by the at least one parameter indicative of a speed of the mobile device, and wherein, at least in a predefined range, the output of the function is monotonically increasing with respect to the input parameter.

According to an exemplary embodiment of all aspects of the present invention, the input parameter is determined based on a multiplication of the location update interval indicated by the at least one parameter indicative of a location update interval is an input to this function and the speed of the mobile device indicated by the at least one parameter indicative of a speed of the mobile device.

According to an exemplary embodiment of all aspects of the present invention, the representative of a size of the geofence is s, and the at least one parameter indicative of a location update interval is u, and the at least one parameter indicative of the speed of the mobile device is v, and wherein, at least in a predefined range, s=const*u*v holds, wherein const is a constant.

According to an exemplary embodiment of all aspects of the present invention, the geofence is a circular geofence and the representative of a size of the geofence is a radius of the circular geofence, wherein the predefined range at last partially depends on a predefined radius r_original, and wherein s=arg_max (r_original, constant*v*u) holds.

According to an exemplary embodiment of all aspects of the present invention, wherein a predefined range is applied when determining a representation of a size of the geofence such that the size of the determined representation of a size of the geofence is within the predefined range, wherein, in particular, the predefined range may define a lower bound of the size of the geofence.

According to an exemplary embodiment of all aspects of the present invention, adjusting a size of the geofence based on the determined representative of a size of a geofence is performed.

According to an exemplary embodiment of all aspects of the present invention, adjusting a size of the geofence based on a reference geofence or a previous geofence is performed.

Furthermore, as an example, the geofence for which a size is adjusted may be associated with a same area-of interest as the previous geofence or the reference geofence.

According to an exemplary embodiment of all aspects of the present invention, said reference geofence and/or the previous geofence is obtained based on a user input.

According to an exemplary embodiment of all aspects of the present invention, said one or more parameters represent a plurality of parameters, and wherein at least one parameter of said plurality of parameters is indicative of further information, in particular information related to a position of the mobile device.

According to an exemplary embodiment of all aspects of the present invention, said apparatus is or is part of the mobile device or a server of a positioning support system or any other server, e.g. at least one server of an Internet of Things (IoT) cloud.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
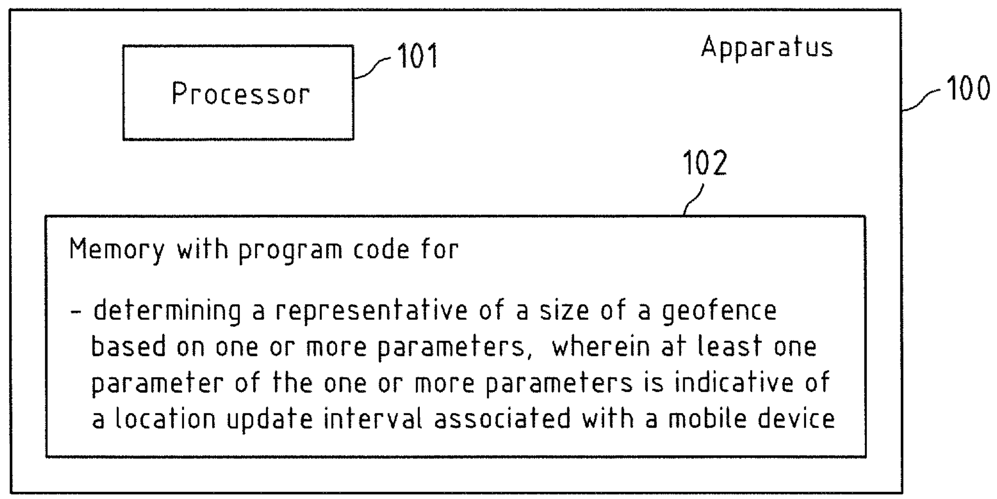
FIG. 1 is a block diagram of an exemplary embodiment of an apparatus according to the invention.

FIG. 1 is a schematic block diagram of an example embodiment of any at least one apparatus according to the invention. Apparatus 100 comprises a processor 101 and, linked to processor 101, a memory 102. Memory 102 stores computer program code for determining a representative of a size of a geofence based on one or more parameters, wherein at least one parameter of the one or more parameters is indicative of a location update interval associated with a mobile device.

Apparatus 100 could be a server or any other kind of client like a mobile or stationary device. If a plurality of apparatus are used, each apparatus may comprise a processor 101, and linked to processor 101, a memory 102, wherein memory 102 at least partially stores computer program code for determining a representative of a size of a geofence based on one or more parameters, wherein at least one parameter of the one or more parameters is indicative of a location update interval associated with a mobile device. For instance, said plurality of apparatus may represent servers in a cloud interaction together. Apparatus 100 could equally be a component, like a chip, circuitry on a chip or a plug-in board, for any mobile or stationary device. Optionally, apparatus 100 could comprise various other components, like a data interface configured to enable an exchange of data with separate devices, a user interface like a touch-screen, a further memory, a further processor, etc.

Figure 2:
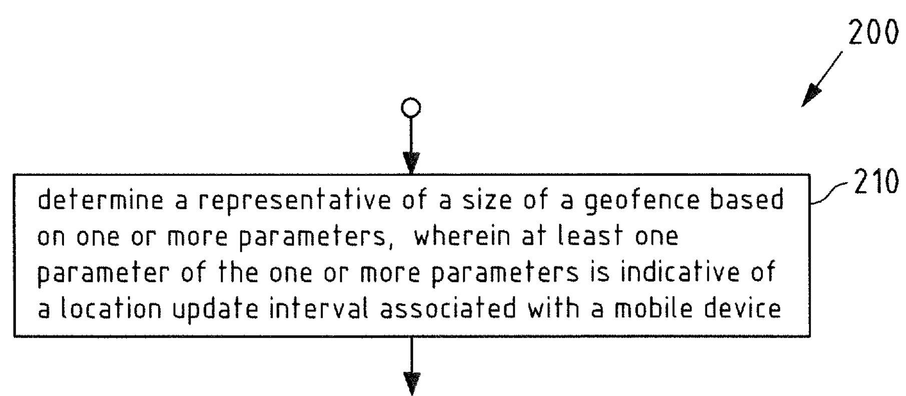
FIG. 2 is a flow chart illustrating an exemplary embodiment of a method according to the invention.

An operation of at least one apparatus will now be described with reference to the flow chart of FIG. 2. The operation is an example embodiment of a method according to the invention. At least one processor 101 (may be one processor 101 or a plurality of processors 101) and the program code stored in at least one memory 102 (may be one memory 102 or a plurality of memories 102) cause at least one apparatus (may be one apparatus ore a plurality of apparatuses) to perform the operation when the program code is retrieved from memory 102 and executed by processor 101. The at least one apparatus that is caused to perform the operation can be apparatus 100 or some other apparatus, for example but not necessarily a device comprising apparatus 100.

The at least one apparatus determines a representative of a size of a geofence based on one or more parameters, wherein at least one parameter of the one or more parameters is indicative of a location update interval associated with a mobile device. (action 210).

A geofence may be considered to be a virtual perimeter for a real-world geographic area or a virtual perimeter for a real-world geographic line. For instance, a geofence may be set around an area-of-interest or, if the geofence is of type line, the geofence may define a kind of border, e.g. a country border or any other well-suited border. As an example, a geofence may be defined by a point and a geometric shape around the point, e.g. a circle or an ellipse around the point. Or, as another example, a geofence may be defined by a polygon, wherein a polygon may be defined by a predefined set of boundaries. Thus, as example, the area of a geofence and/or the shape of a geofence may be defined by one of a polygon;

a rectangle and/or a square;

a cuboid and/or a cube;

an ellipse and/or a circle; and an ellipsoid and/or a sphere.

Furthermore, as an example, if the geofence is of type line, the line of the geofence may be defined by one of a polygon, and/or a straight line (e.g.), and/or a curve.

A geofence may be considered to define an area-of-interest at and/or around a specific location. For instance, a geofence could be a check point or a check area on the delivery route of a vehicle, e.g. a truck (or any movable mobile device), and somebody could be interested to know and get a notification when the delivery vehicle visits the check point (or check are), which could for example be one of the delivery locations (areas). Of course, a geofence could be used for any other well-suited area-of-interest, e.g. a school attendance zone or any other zone.

Or, as another example, if the geofence is of type line, the geofence may be considered to define a border such that it could be checked whether somebody (e.g. an asset, e.g. a vehicle or truck or any movable mobile device) moves over the border being defined by the geofence. For instance, the border may be a country border and thus it can be checked whether an asset has moved over the country border.

Figure 3A:
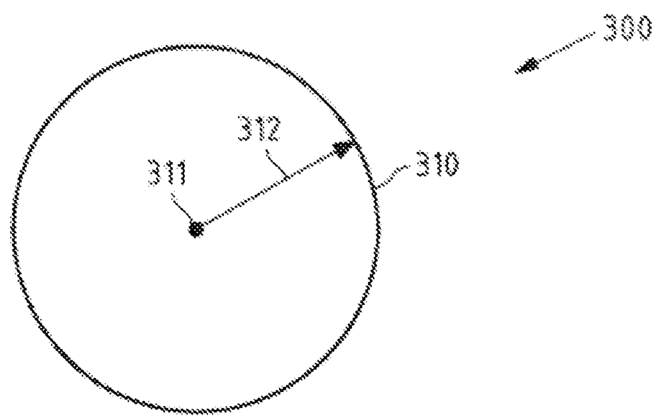
FIGS. 3a-3c show example representations of a geofence according to the invention.
Figure 3B:
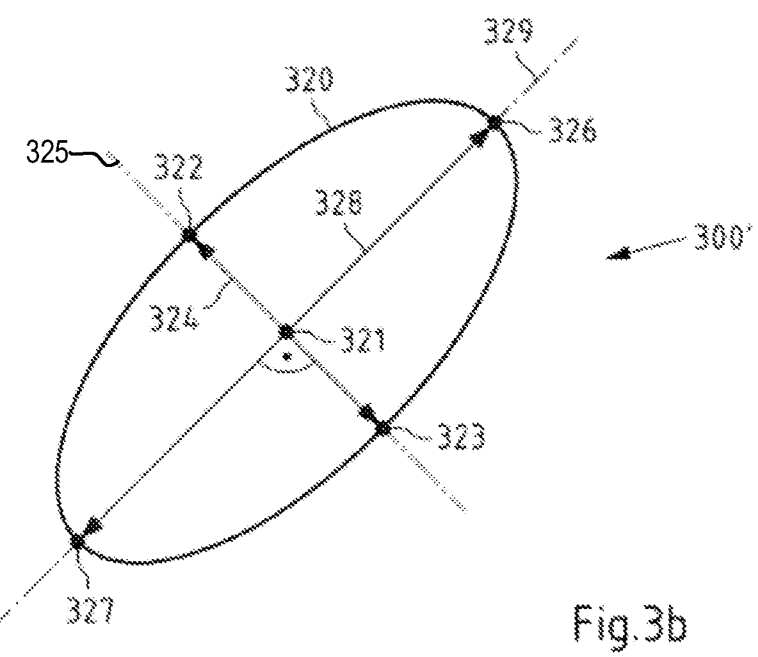
Figure 3C:
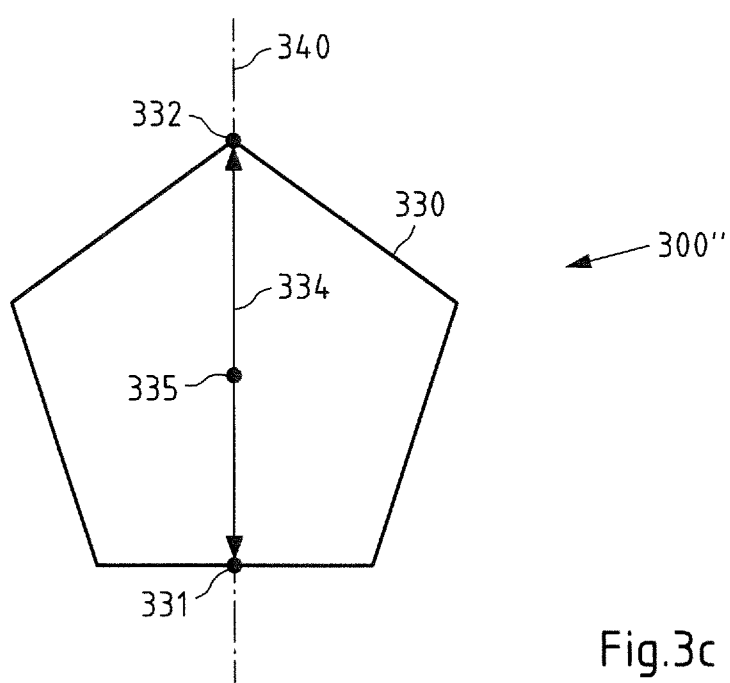

FIGS. 3*a* to 3*c* show several non-limiting examples of geofences.

As exemplarily depicted in FIG. 3*a*, a geofence 310 may be defined by a point 311 and a radius 312 such that an area defined by the geofence is a circle around the point 311 with radius 312, as exemplarily shown in FIG. 3*a*.

As exemplarily depicted in FIG. 3*b*, a geofence may be defined by an ellipse 320, which may be arranged around a point 321.

As exemplarily depicted in FIG. 3*c*, a geofence may be defined by a polygon 330 set around an area-of-interest. For instance, said polygon 330 may be a standard polygon which enables the capture of a complex area in the real-word. In FIG. 3*c*, point 335 may define the centre of the area defined by geofence 330, and axis 340 may represent an example of a direction.

According to action 210 of method 200, a representative of a size of a geofence 310, 320, 330 is determined.

As one example, such a size of a geofence may be indicative of the whole size of the geofence 310, 320, 330. Then, for instance, the size of the geofence may be a representative of or correlated to the whole area of the geofence. For instance, if the geofence is defined by a circle, then the radius, or the diameter or the circumference may be a representative of a size of the geofence, or as another example, if the geofence is defined by an ellipse or a polygon, the size being the whole size may be defined by the circumference of the ellipse 320 or the polygon 330 or another suitable representative being correlated with the area defined by the ellipse or the polygon. Accordingly, for instance, if the whole size of the geofence 310, 320, 330 is used, and if a new (whole) size of the geofence 310, 320, 330 is determined in action 210 compared to a former (whole) size of the geofence 310, 320, 330, the shape of the geofence 310, 320, 330 will not change but only the (whole) size of the geofence 310, 320, 330.

As another example, such a size of a geofence may be indicative of an extension (or length) of the geofence in at least one direction (e.g. in exactly one direction). It may be assumed that the extension (or length) of the geofence goes through a predefined point within the area defined by the geofence, wherein this predefined point may represent the centre of the area defined by the geofence.

In the special case that the geofence is defined by a circle, such as exemplarily depicted in FIG. 3*a*, this extension (or length) of the geofence in one direction would always be the same irrespective of the orientation of the direction. However, in case of another shape of the geofence, this extension (or length) of the geofence could vary depending on the direction. E.g. in case that the direction is along axis 325 the extension (or length) 324 of the geofence 320 in this first direction 325 would be between point 323 crossing the ellipse 320 and point 322 crossing the ellipse 320 and may go through centre 321, wherein these points 323 and 322 are defined by the intersections of the axis 325 associated with the first direction, and in case that the direction is along axis 329 the extension (or length) 328 of the geofence 320 in this second direction 329 would be between points 327 crossing the ellipse 320 and point 326 crossing the ellipse 320 and may go through centre 321. Then as an example extension (or length) of the geofence representing a size of the geofence would differ with respect to the two different directions 325 and 329 due to the shape of the geofence 320.

Or, as another example with respect to FIG. 3*c*, the direction may be indicated by reference sign 340 such that an extension (of length) 334 of the geofence 330 in this direction 340 may extend between point 331 crossing the border of polygon 330 and point 3332 crossing the border of polygon 330 and may go through centre 335.

For instance, if a size of a geofence may be indicative of an extension (or length) of the geofence in a first direction (e.g. in exactly one direction) the size of the geofence may be kept constant or may be kept approximately constant in a second direction being orthogonal to the first direction if a new size of the geofence 310, 320, 330 is determined in action 210 compared to a former size of the geofence 310, 320, 330, i.e. the shape of the new or updated geofence 310, 320, 330 might change compared to the shape of the initial or previous geofence 310, 320, 330. For instance, keeping a value approximately constant may represent a value deviated less than 10%, or less than 5%, or less than 1% from the reference value.

According to action 210 of method 200, a representative of a size of a geofence 310, 320, 330 is determined based one or more parameters, wherein at least one parameter of the one or more parameters is indicative of a location update interval associated with a mobile device.

For instance, the mobile device may be part of may be moved by a movable entity, wherein the movable entity may be a vehicle, e.g. a car or a truck or a motorbike or any other suitable vehicle, or a bike or a person that carries the mobile device and may walk around. The mobile device may be configured to determine its position (e.g. its location). As an example, the mobile device may comprise means for determining the position of the mobile device, e.g. based on signals received from at least one Global Satellite navigation system satellite (GNSS) system, for example based on signals received from GPS satellites, from BeiDou satellites, from GLONASS satellites or from Galileo satellites or other satellites. As an example, the mobile device may comprise a GNSS receiver in order to receive signals from the GNSS system such that mobile device of the at least one mobile device can estimate its location based on the GNSS signals. And/or, as an example, the mobile device may comprise a cellular and/or Wifi and/or Bluetooth receiver in order to receive signals from at least one cellular system, and/or from at least one Wifi system and/or from at least one Bluetooth system.

For instance, the means for determining the position may comprise means for estimating the position based on the received GNSS signals, and/or on the received cellular signals, and/or non the received Wifi signals, and/or on the received Bluetooth signals, i.e., in this case the mobile device may be considered to have own positioning capabilities. Thus, the mobile device may be configured to make measurements of the radio environment, e.g. measurements of the cellular signals and/or of the Wifi signals and/or measurements of the Bluetooth signals which can be used by the mobile device to estimate the position of mobile device. And/or, for instance, the mobile device may be configured to make measurements of the radio environment, e.g. measurements of the cellular signals and/or of the Wifi signals and/or measurements of the Bluetooth signals, and may be configured to transmit at least a part of the measurements to a cloud or server, e.g. via a wireless connection, such that the cloud or the server may estimate the mobile device's position based on the measurements received from the mobile device. Then, for instance, the cloud or the server may be configured to transmit the estimated position to the mobile device.

Thus, the position (or location) of the mobile device can be estimated (or calculated). The location update interval associated with the mobile device may define a frequency indicating how often the position of the mobile device is estimated in a predefined time period or indicating the time period between two subsequent estimations of the mobile device. For instance, the location update interval associated with the mobile device may represent a mean interval between two consecutive location update instants. As a non-limiting example, the location update interval may indicate how frequently the position of the mobile device is estimated, e.g. in terms a time interval between two consecutive estimations of the mobile device. Just as an example, the location update interval of a mobile device could be one second, i.e., the time interval is one second which means that the position of the mobile device is estimated (or calculated) every second. It has be understood that any other location update interval could be applied to the mobile device, e.g. every $10^{th}$ second or every minute, or every five minutes. A short location update interval associated with the mobile device may lead to increased power consumption of the mobile device compared to a longer location update interval, and therefore, it may be desired in power-constrained mobile devices to prefer or relatively long location update interval, e.g. in the range of several second or even minutes compared to an interval of one second or even less.

For instance, the location update interval associated with the mobile device may be provided by the mobile device.

Furthermore, as an example, the location update interval associated with the mobile device may be varied based on a predefined function. Thus, the location update interval can be varied and is not necessarily fixed to one value.

The at least one parameter indicative of a location update interval associated with a mobile device may be considered to indicate a time interval between two consecutive location estimations (or calculations) of the mobile device, e.g. as explained above. For instance the at least one parameter indicative of a location update interval associated with a mobile device may be a value of this time interval, e.g. in terms of second or another suitable unit, or a value being proportional to this time interval.

The representative of a size of a geofence 310, 320, 330 is determined based one or more parameters, wherein at least one parameter of the one or more parameters is indicative of a location update interval associated with a mobile device (action 210), i.e., the representative of a size of a geofence 310, 320, 330 is determined at least based on the at least one parameter indicative of a location update interval associated with the mobile device. Accordingly, the size of the geofence 310, 320, 330 may be determined to match to the location update interval associated with the mobile device.

For instance, the longer the location update interval indicated by the at least one parameter, the larger the size of the geofence, and/or, for instance, the shorter the location update interval indicated by the at least one parameter, the shorter the size of the geofence.

Thus, as a first example, if the location update interval is short the location of the mobile device can be tracked with a high frequency, i.e., the time interval between two consecutive location estimates of the mobile device is relatively short, and thus, the representative of a size of the geofence 310, 320, 330 may be determined to be relatively low since due to the short location update interval the probability that the mobile device is detected when moving into to the geofence can be considered to be relatively high. On the other hand, as a second example, if the location update interval is low the location of the mobile device can only be tracked with a low frequency, i.e., the time interval between two consecutive location estimates of the mobile device is relatively high, and thus, the representative of a size of the geofence 310, 320, 330 may be determined to be relatively high since due to the long location update interval the representative of a size of the geofence 310, 320, 330 must be enlarged compared to the determined representative of a size of the geofence 310, 320, 330 of the first example in order to ensure or at least to ensure a reasonable probability that the mobile device is detected when moving into to the geofence. If in the second example the representative of a size of the geofence 310, 320, 330 would be still low it could probably happen that the mobile device moves through the geofence (being associated with the representative of a size indicating a low size of the geofence) without any position estimation performed in the geofence, and thus, as an example, it could not be detected that the mobile device is within the geofence although the mobile device has move through the geofence.

Accordingly, the size of the geofence can be adapted to the location update interval associated with the mobile device such that even in case the mobile device applies a long location update interval, e.g. in order to reduce power consumption compared to a shorter location update interval, it can be still detected when the mobile devices moves into the geofence or there is at least a good probability that mobile device is detected when it moves into the geofence.

Thus, for instance, the longer the location update interval indicated by the at least one parameter, the larger the size of the geofence indicated by the representative of a size of the geofence may be determined in action 210, and/or, for instance, the shorter the location update interval indicated by the at least one parameter, the shorter the size of the geofence indicated by the representative of a size of the geofence may be determined in action 210.

It has to be understood that, for instance, the representative of a size of geofence determined in action 210 must not necessarily depend only on the at least one parameter indicative of the location update interval associated with the mobile device, but said determining a representative of a size of geofence in action 210 may, as an optional example, further depend on other parameters. E.g., the one or more parameters may represent a plurality of parameters comprising the at least one parameter indicative of the location update interval associated with the mobile device and comprising at least one further parameter.

As an example, said determining a representative of a size of a geofence in action 210 may comprise at least one of: (i) determining a large size in case that the at least one parameter indicative of a location update interval indicates a long location update interval; (ii) determining a small size in case that the at least one parameter indicative of a location update interval indicates a short location update interval; (iii) determining a larger size in case that the at least one parameter indicative of a location update interval indicates a longer location update interval as compared to when the at least one parameter indicative of a location update interval indicates a shorter location update interval, and (iv) determining a smaller size in case that the at least one parameter indicative of a location update interval indicates a shorter location update interval as compared to when the at least one parameter indicative of a location update interval indicates a longer location update interval.

A large size of the geofence is larger than a short size of the geofence and a long location update interval is longer than a short location update interval.

As an example, said determining a representative of a size of a geofence 310, 320, 330, in action 210 may be based on a function, wherein the location update interval indicated by the at least one parameter indicative of a location update interval is an input to this function and wherein the size of the geofence is an output of this function, and wherein, at least in a predefined range, the function is monotonically or strictly increasing with respect to the location update interval as input.

For instance, this function may be represented by f1(u), wherein u is a value of the location update interval indicated by the at least one parameter indicative of a location update interval associated with the mobile device, and the output of the function f1(u) may be denoted as s, wherein s=f1(u) holds, and wherein s is the representative of a size of a geofence. Thus, function f1(u) may be used to determine the size of a geofence 310, 320, 330 in action 210 and/or in action 510.

For instance, function f1 may be, at least in a predefined range, monotonically increasing with respect to u as input, i.e., with respect to the location update interval u associated with the mobile device as input, i.e., the following may hold:

s1=f1(u1)≥s2=f1(u2), if u1>u2, and s1=f1(u1)≤s2=f1(u2), if u1<u2, wherein this may hold at least in predefined range of u_low<u<u_max, and/or for a predefined range s=f1(u)>s_min and/or s=f1(u)<s_max.

As an example, the predefined range which may be applied when determining a representation of a size of the geofence may define a predefined lower bound s_min of the size of the geofence, e.g. as the above-mentioned s_min, such that the determined representation of a size of the geofence does not fall below the predefined lower bound and/or may define a predefined upper bound s_max of the size of the geofence, e.g. as the above-mentioned s_max, such that the determined representation of a size of the geofence does not exceed the upper bound. Thus, if f1(u)<s_min then s=s_min may hold and/or if f1(u)>s_max then s=s_max may hold. For instance, said one or more parameters used as basis for determining a size of the geofence in action 210 or 510 may be a plurality of parameters, wherein at least one parameter of the plurality of parameters is indicative of the predefined range.

Or, as another example, function f1 may be, at least in a predefined range, strictly increasing with respect to u as input, i.e., with respect to the location update interval associated with the mobile device as input, i.e., the following may hold:

s1=f1(u1)>s2=f1(u2), if u1>u2, and s1=f1(u1)<s2=f1(u2), if u2>u1, wherein this may hold at least in predefined range of u_low<u<u_max, and/or for a predefined range s=f1(u)>s_min and/or s=f1(u)<s_max.

As an example, the predefined range which may be applied when determining a representation of a size of the geofence may define a predefined lower bound s_min of the size of the geofence, e.g. as the above-mentioned s_min, such that the determined representation of a size of the geofence does not fall below the predefined lower bound and/or may define a predefined upper bound s_max of the size of the geofence, e.g. as the above-mentioned s_max, such that the determined representation of a size of the geofence does not exceed the upper bound. Thus, if f1(u)<s_min then s=s_min may hold and/or if f1(u)>s_max then s=s_max may hold. For instance, said one or more parameters used as basis for determining a size of the geofence in action 210 or 510 may be a plurality of parameters, wherein at least one parameter of the plurality of parameters is indicative of the predefined range. These explanations with respect to the predefined range may hold in similar or same way with respect to any mentioned predefines ranges in the sequel.

Thus, the function f1 may ensure that the longer the location update interval indicated by the at least one parameter, the larger the size of the geofence, and/or, for instance, the shorter the location update interval indicated by the at least one parameter, the shorter the size of the geofence, e.g. in at least a part of the predefined range, and/or, the function f1 may ensure that a large size of the geofence is determined in case that the at least one parameter indicative of a location update interval indicates a long location update interval and that a small size of the geofence is determined in case that the at least one parameter indicative of a location update interval indicates a short location update interval.

As an example, function f1 may process at least one further input parameter in addition to the location update interval u. Then, for instance, if all further input parameter(s) are kept constant, the outputs of the function f1 is monotonically increasing (or strictly increasing) with respect to a variable input of the location update interval u.

Furthermore, as an example, the representative of a size of a geofence may be determined in action 210, in particular in at least a part of a predefined range, to be (substantially) proportional to an location update interval indicated by the at least one parameter indicative of a location update interval of the mobile device.

Thus, for instance, if said function f1 is applied to determine the representative of a size of a geofence, then, in at least a part of the predefined range, f1=const*u may hold, wherein const may represent a constant, or, f1=const*u+const2 may hold, wherein const2 may represent a second constant defining an offset const2>0, such that the size of the geofence is not determined to be approximately zero in case the location update rate is very fast, i.e., u nearby or equal to zero.

Figure 4A:
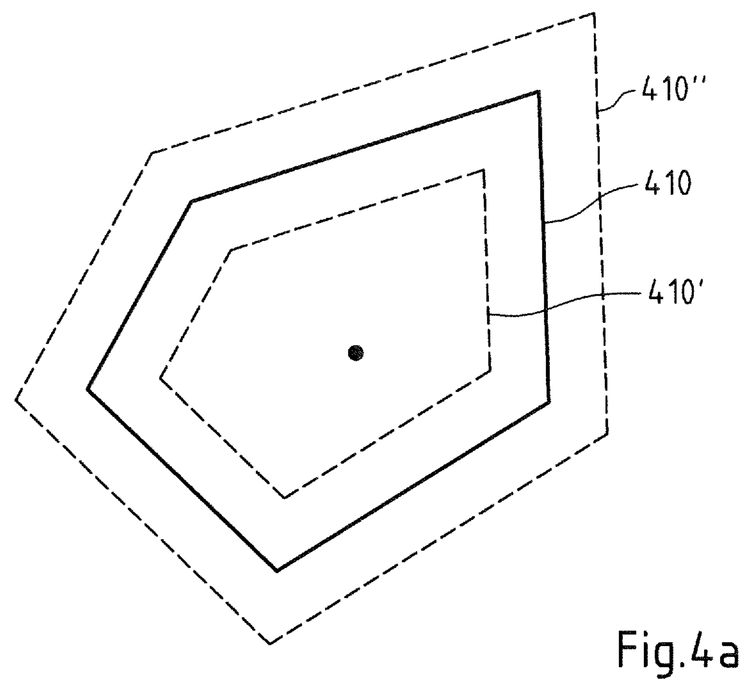
FIGS. 4a-4b show examples of adjusting a size of a geofence according to the invention.
Figure 4B:
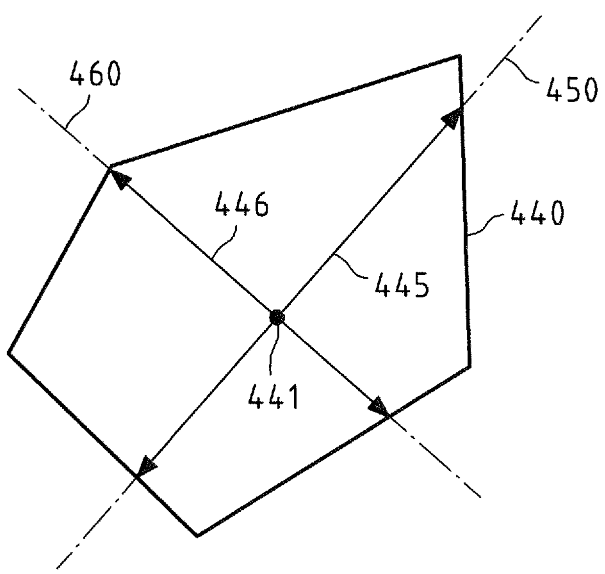
Figure 5A:
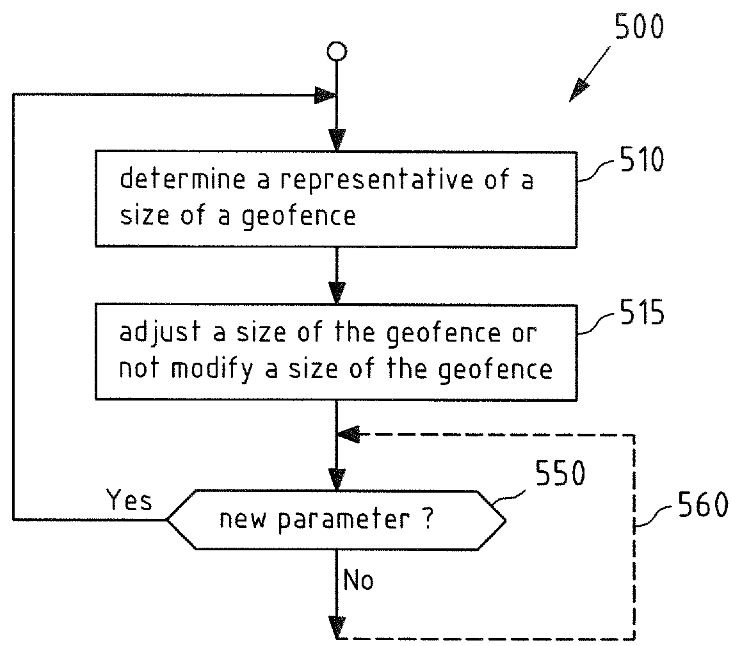
FIG. 5a is a flow chart illustrating another exemplary embodiment of a method according to the invention.

FIG. 5*a* shows an example embodiment of a method 500 according the present invention. This method 500 will be explained, just as an example, with respect to the examples of geofences 410 and 440 depicted in FIGS. 4*a* and 4*b*. However, method 500 may be applied to any geofence, e.g. including geofences 310, 320, 330.

Method 500 comprises determining a representative of a size of a geofence based on one or more parameters, wherein at least one parameter of the one or more parameters is indicative of a location update interval associated with a mobile device. (action 510). This determining a representative of a size of a geofence may correspond to action 210 of method 200, and therefore all explanations given with respect to action 210 may also hold for action 510.

In method 500 it is assumed that a size of the geofence has already been determined before, wherein this size of the geofence may be considered to be a previous size of the geofence, wherein the previous size may also represent an initial size of the geofence.

For instance, in FIG. 4*a*, as an example, the size of geofence 410 may be considered to represent a previous size (or initial size) of the geofence 410, and in FIG. 4*b*, as an example, the size of geofence 440 may be considered to represent a previous size (or initial size) of the geofence 440.

Then, in action 515 a size of the geofence 410, 440 may be adjusted based on the representative of a size of geofence determined in action 510 or may be not modified.

For instance, in action 515, if the determined size of the geofence (i.e., the size indicative by the representative of a size of a geofence determined in action 510) is smaller than a previous size of the geofence 410, 440, said adjusting a size of the geofence 410, 440 in action 515 may be performed and may comprise decreasing the size of the geofence based on the determined size of the geofence compared to the previous size of the geofence 410, 440, or, as another example, if the determined size of the geofence (i.e., the size indicative by the representative of a size of a geofence determined in action 510) is larger than a previous size of the geofence 410, 440, said adjusting a size of the geofence 410, 440 in action 515 may be performed and may comprise increasing the size of the geofence based on the determined size of the geofence compared to the previous size of the geofence 410, 440. Furthermore, it has to be understood that in action 515 may even comprise not changing the size of the geofence (i.e., the size of the geofence is not modified) in case that the determined size of the geofence is substantially the same or exactly the same as the previous size of the geofence.

Furthermore, as an example, during adjusting a size of the geofence 320, 330 in action 515 a point 321, 335 defining the centre of the geofence 320, 330 may be stored such that the information on the centre 321, 335 of the geofence 320, 330, e.g. as depicted in FIGS. 3*b* and 3*c*, is maintained and is not lost, e.g., even if said adjusting a size of the geofence 320, 330 in action 515 comprises modifying the geometry (e.g. the shape) of the geofence 320, 330.

After adjusting the size of the geofence (or not modifying the size of the geofence) in action 515, method 500 may proceed with checking whether there is at least one new (or updated parameter) available, wherein this at least one new (or updated parameter) may be of the one or more parameters which are used for determining a representative of a size of a geofence in action 510 (or in action 210).

Thus, for instance, if there is a new location update interval associated with the mobile device available, this may be detected in action 550 and method 500 starts again at action 510 in order to determine a representation of a size of the geofence based on the one or more parameters comprising the at least one new (or updated) parameter being indicative of the updated location update interval associated with the mobile device.

In action 515, the previous size of the geofence which may be used as basis for performing the adjustment may be the size of the geofence that has been generated by adjustment of the geofence previously performed action 515.

Thus, method 500 allows to adjust 515 the size of the geofence 410, 440 based on the determined representative of a size of a geofence determined in action 510, wherein a new parameter or new parameters having influence on the determined representative of a size of the geofence may trigger method 500 by means of action 550.

Figure 5B:
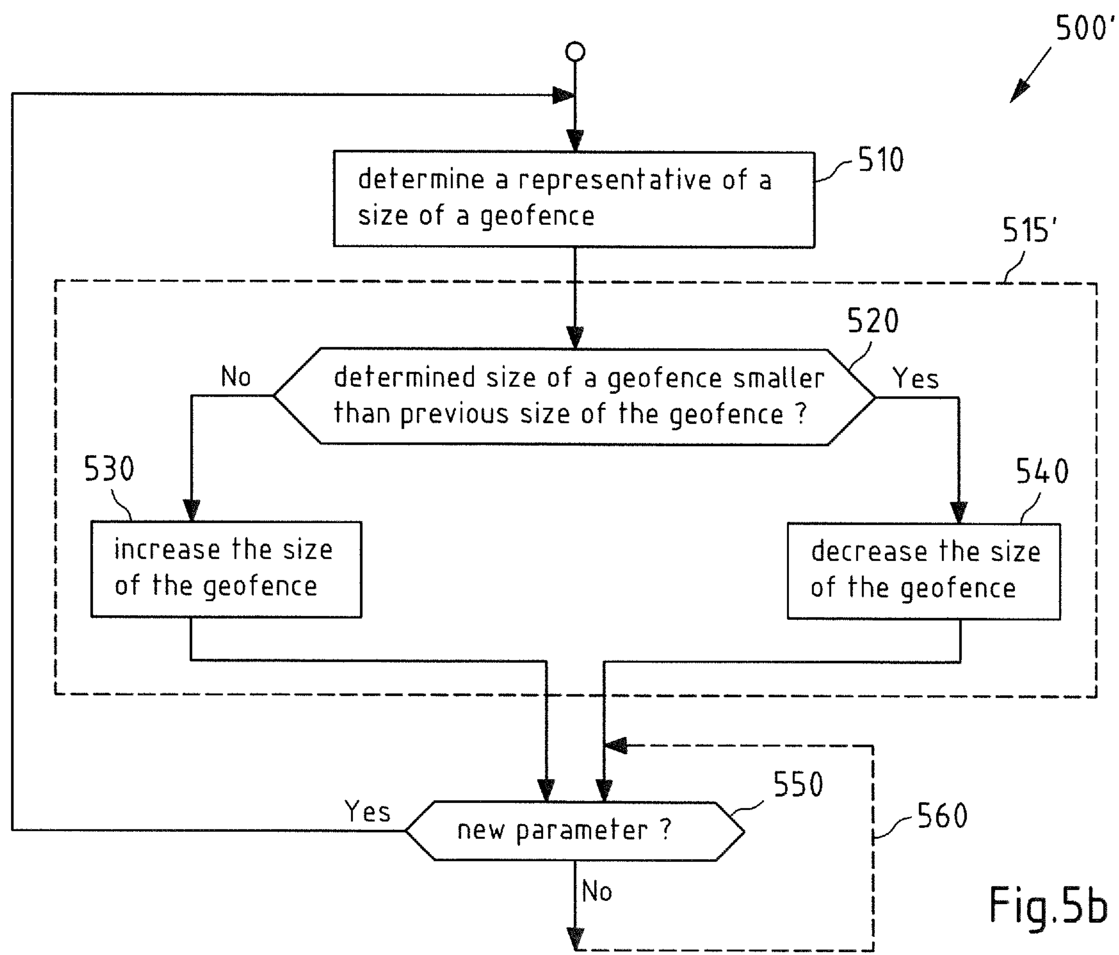
FIG. 5b is a flow chart illustrating another exemplary embodiment of a method according to the invention.

FIG. 5*b* shows an example embodiment of a method 500' according the present invention, wherein method 500' may represent an implementation of method 500 depicted in FIG. 5*a* and wherein actions denoted by the same reference sign in FIG. 5*b* as well as in FIG. 5*a* may be considered to be the same. This method 500' will be explained, just as an example, with respect to the examples of geofences 410 and 440 depicted in FIGS. 4*a* and 4*b*. However, method 500' may be applied to any geofence, e.g. including geofences 310, 320, 330. In particular, for instance, compared to method 500 the method 500' depicted in FIG. 5*b* may be considered to represent an example of adjusting a size of the geofence 515 of method 500 by means of action 515' depicted in FIG. 5*b*. I.e., the explanations presented with respect to actions 520, 530, 530 being part of action 515' in FIG. 5*b* may be considered as an example realization of action 515 of method 500.

Method 500' comprises determining a representative of a size of a geofence based on one or more parameters, wherein at least one parameter of the one or more parameters is indicative of a location update interval associated with a mobile device. (action 510). This determining a representative of a size of a geofence may correspond to action 210 of method 200, and therefore all explanations given with respect to action 210 may also hold for action 510.

In method 500' it is assumed that a size of the geofence has already been determined before, wherein this size of the geofence may be considered to be a previous size of the geofence, wherein the previous size may also represent an initial size of the geofence.

For instance, in FIG. 4*a*, as an example, the size of geofence 410 may be considered to represent a previous size (or initial size) of the geofence 410, and in FIG. 4*b*, as an example, the size of geofence 440 may be considered to represent a previous size (or initial size) of the geo fence 440.

Then it is checked whether the determined size of the geofence is smaller than a previous size of the geofence 410, 440.

If yes, method 500' may proceed with action 540 and may decrease the size of the geofence 410, 440 based on the determined size of the geofence. If the determined size of the geofence is not smaller than a previous size of the geofence 410, 440, the method may proceed with action 540 and may increase the size of the geofence based on the determined size of the geofence. It has to be understood that action 540 may comprise not changing the size of the geofence in case that the determined size of the geofence (determined in action 510) is substantially the same or exactly the same as the previous size of the geofence.

For instance, FIG. 4*a* shows a non-limiting example in which a size a geofence 410 may be indicative of the whole size of the geofence 410', wherein in this example geofence 410 may be defined by a polygon. For instance, the geofence 410 shows the geofence 410 with an initial size or previous size, wherein this size of the geofence may be associated with one or more parameters, wherein at least one parameter of the one or more parameter is indicative of a initial or previous location update rate of the mobile device. As an example, this initial size or previous size of geofence 410 may have been determined by means of action 210 in method 200.

Then, if the determined size of the geofence 410 (action 510) is smaller than the previous size of the geofence, method 500' may proceed with action 540 and may decrease the size of the geofence 410, e.g. based on the determined size of the geofence 410. Thus, a new or updated geofence 410' may be generated based on the determined size of the geofence 410, e.g. by decreasing the size of the geofence in action 540. Geofence 410' shows an example of such a new or updated geofence 410' having a decreased size compared to the size of the geofence 410. Since in this example in FIG. 4*a*, the size a geofence 410 may be indicative of the whole size of the geofence 410', the shape of new or updated geofence 410' may be still the same as the shape of previous geofence 410.

Or, if the determined size of the geofence 410 (action 510) is not smaller than the previous size of the geofence, method 500' may proceed with action 530 and may increase the size of the geofence 410, e.g. based on the determined size of the geofence 410. Thus, a new or updated geofence 410" may be generated based on the determined size of the geofence 410, e.g. by increasing the size of the geofence 410 in action 530. Geofence 410" shows an example of such a new or updated geofence 410" having an increased size compared to the size of the geofence 410. Since in this example in FIG. 4*a*, the size a geofence 410 may be indicative of the whole size of the geofence 410', the shape of new or updated geofence 410" may be still the same as the shape of previous geofence 410. Thus, method 500' may comprising maintaining a shape associated with the geofence 410', 410" compared to a shape associated with a reference (or previous) geofence 440, e.g. during action 530 instead of increasing the size of the geofence and/or during action 540 instead of decreasing the size of the geofence, in particular if the determined size of the geofence is substantially the same or exactly the same as the previous size of the geofence.

Thus, as exemplarily described with respect to geofence 410 depicted in FIG. 4*a* and as an example, said determining a representative of a size of the geofence (e.g. in action 210 or in action 510) may comprise maintaining the shape associated with the geofence compared to a shape associated with a previous geofence, wherein the previous geofence may be considered to represent a reference geofence. Furthermore, as an example, the geofence for which a representative of a size is determined (e.g. in action 210 or 510) may be associated with the same area-of interest as the previous geofence or the reference geofence.

As an example, FIG. 4*b* shows a non-limiting example in which a size a geofence 440 may be indicative of an extension (or length) 445 of the geofence 440 in at least one direction 450 (e.g. in exactly one direction 450), wherein in this example geofence 410 may be defined by a polygon. For instance, the geofence 440 shows the geofence 440 with an initial size or previous size, wherein this size of the geofence may be associated with one or more parameters, wherein at least one parameter of the one or more parameter is indicative of a initial or previous location update rate of the mobile device. As an example, this initial size or previous size of geofence 440 may have been determined by means of action 210 in method 200.

Then, if the determined size of the geofence (action 510) is smaller than the previous size of the geofence 440, method 500' may proceed with action 540 and may decrease the size of the geofence 440, e.g. based on the determined size of the geofence 440. Thus, a new or updated geofence 440' may be generated based on the determined size of the geofence 440, e.g. by decreasing the size of the geofence 440 in action 540. Geofence 440' shows an example of such a new or updated geofence 440' having a decreased size compared to the size of the geofence 440. Since in this example in FIG. 4*b* the size a geofence 410 may be indicative of an extension (or length) 445 of the geofence 440 in at least one direction 450, the shape of new or updated geofence 410' may be differ from the shape of the previous geofence 440. Thus, method 500' may comprise changing or modifying a shape associated with the geofence 440', 440' compared to a shape associated with a reference (or previous) geofence 440, e.g. during action 540 or action 530.

Accordingly, as exemplarily described with respect to geofence 440 depicted in FIG. 4*b* and as an example, said determining a representative of a size of the geofence (e.g. in action 210 or in action 510) may comprise changing or modifying the shape associated with the geofence compared to a shape associated with a previous geofence, wherein the previous geofence may be considered to represent a reference geofence. Furthermore, as an example, the geofence for which a representative of a size is determined (e.g. in action 210 or 510) may be associated with the same area-of interest as the previous geofence or the reference geofence.

Thus, as an example, in action 540 the length or extension 445 of geofence 440 in the first direction 450 may be decreased, wherein, for instance, the length of extension 446 of geofence 450 may be kept constant or may be kept approximately constant. For instance, keeping a value approximately constant may represent a value deviated less than 10%, or less than 5%, or less than 1% from the reference value.

E.g., if a size of a geofence may be indicative of an extension (or length) of the geofence in a first direction (e.g. in exactly one direction) 450 the size of the geofence may be kept constant or may be kept approximately constant in a second direction 460 being orthogonal to the first direction 450 if a size of the geofence decreased in action 540 compared to a former size of the geofence 440, i.e., the shape of the geofence 440' obtained by decreasing the size of the geofence in action 540 may differ from the shape of the previous or initial geofence 440. Or, for instance, if the determined size of the geofence (action 510) is not smaller than the previous size of the geofence 440, method 500' may proceed with action 530 and may increase the size of the geofence 440, e.g. based on the determined size of the geofence 440. Thus, a new or updated geofence 440" may be generated based on the determined size of the geofence 440, e.g. by increasing the size of the geofence 440 in action 540. Geofence 440" shows an example of such a new or updated geofence 440' having an increased size compared to the size of the geofence 440. Since in this example in FIG. 4*b* the size a geofence 410 may be indicative of an extension (or length) 445 of the geofence 440 in at least one direction 450, the shape of new or updated geofence 410" may be differ from the shape of the previous geofence 440.

Thus, as an example, in action 540 the length or extension 445 of geofence 440 in the first direction 450 may be increased, wherein, for instance, the length of extension 446 of geofence 450 may be kept constant or may be kept approximately constant. For instance, keeping a value approximately constant may represent a value deviated less than 10%, or less than 5%, or less than 1% from the reference value.

E.g., if a size of a geofence may be indicative of an extension (or length) of the geofence in a first direction (e.g. in exactly one direction) 450 the size of the geofence may be kept constant or may be kept approximately constant in a second direction 460 being orthogonal to the first direction 450 if a size of the geofence is increased in action 530 compared to a former size of the geofence 440, i.e., the shape of the geofence 440" obtained by increasing the size of the geofence in action 540 may differ from the shape of the previous or initial geofence 440.

After decreasing or increasing the size of the geofence, method 500' may proceed with checking whether there is at least one new (or updated parameter) is available, wherein this at least one new (or updated parameter) may be of the one or more parameters which are used for determining a representative of a size of a geofence in action 510 (or in action 210).

Thus, for instance, if there is a new location update interval associated with the mobile device available, this may be detected in action 550 and method 500' starts again at action 510 in order to determine a representation of a size of the geofence based on the one or more parameters comprising the at least one new (or updated) parameter being indicative of the updated location update interval associated with the mobile device.

In action 520, the previous size of the geofence may be the size of the geofence that has been generated by increasing the size of the geofence in previously performed action 530 or the size of the geofence that has been generated by decreasing the size of the geofence in previously performed action 540.

Thus, method 500' allows to adjust 515' the size of the geofence 410, 440 based on the determined representative of a size of a geofence determined in action 510, wherein a new parameter or new parameters having influence on the determined representative of a size of the geofence may trigger method 500 by means of action 550. For instance, said action 515' comprising adjusting the size of the geofence 410, 440 in method 500' may be considered to be an example implementation of action 515 of method 500 depicted in FIG. 5*a*.

According to an example embodiment, the one or more parameters are a plurality of parameters, wherein, at least one parameter of the plurality of parameters may be indicative of a direction of movement associated with the mobile device.

Figure 6:
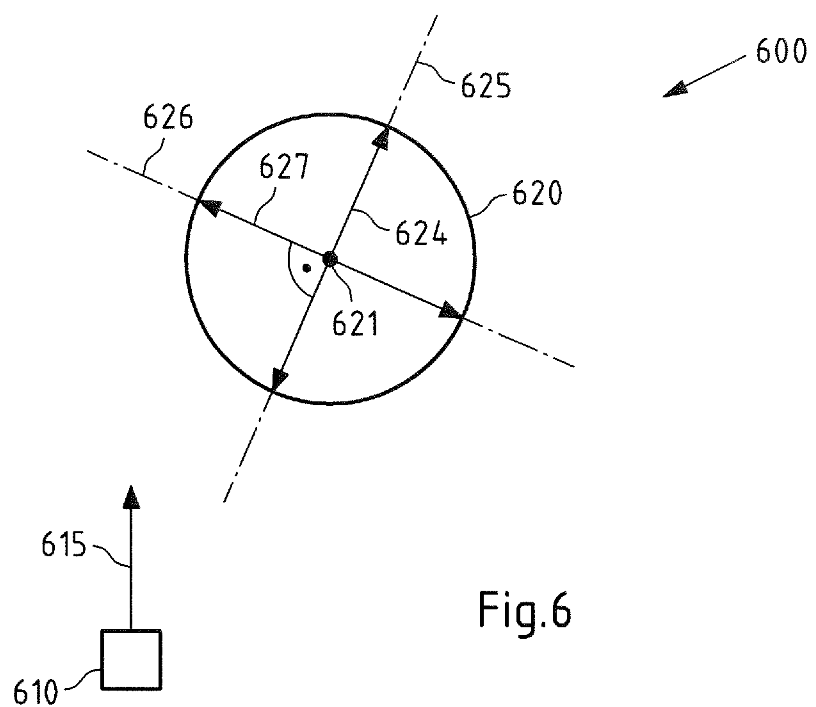
FIGS. 6 and 7 show examples of adjusting a size of a geofence according to the invention.

For instance, said direction of movement associated with the mobile device may represent a direction 615 of movement of the mobile device 610, as exemplarily indicated in FIG. 6, wherein this direction 615 may be determined based on positioning of the mobile device 610, e.g. based on the movement of mobile device 615 between two or more points of locations in which the position of the mobile device was estimated, e.g. as explained before.

FIG. 6 depicts a geofence 620, wherein in this example geofence 620 may represent an ellipse 620, but it may be any other well-suited geofence (e.g. polygon or other).

Then, for instance, in action 210 or in action 510, the determined representative of a size of the geofence is representative of a size of the geofence 620 in a direction 625 which is substantially the same as the direction of movement 615 associated with the mobile device 610 indicated by the respective at least one parameter of the plurality of parameters. In particular, this may hold if the size of a geofence is indicative of an extension (or length) 624 of the geofence in a first direction (e.g. in exactly one direction) 625. For instance, the first direction 625 may be considered to have the same direction as the direction 615 of movement of the mobile device 610 if the axis defined by direction 615 and the axis defined by the first direction 625 are parallel to each other, and/or, as an example, the first direction 625 may be considered to have the substantially same direction as the direction 615 of movement of the mobile device 610 if the axis defined by direction 615 and the axis defined by the first direction 625 define an intersection angle of less than 10°, or less than 5°, or less than 1°.

Thus, the size of the geofence 620 can be determined in a direction 625 which reflects or substantially reflects the direction 615 of movement of the mobile device 610, e.g. by means of adjusting the size of the geofence based on method 500 depicted in FIG. 5. This may show the advantage that the size of the geofence can be increased or decreased in the direction 615 of movement of the mobile device 610, since this direction could be assumed to be the relevant direction when the mobile device 615 enters the geofence 620. Furthermore, for instance, a size 627 of the geofence 620 in a direction 626 being orthogonal to the first direction 625 might be kept constant or may be kept approximately if a size 621 of the geofence 620 is increased in the first direction 625, e.g. during action 530, compared to a former size of the geofence 620 in the first direction 625, and/or, a size 627 of the geofence 620 in a direction 626 being orthogonal to the first direction 625 might be kept constant or may be kept approximately constant if a size 621 of the geofence 620 is decreased in the first direction 625, e.g. during action 540, compared to a former size of the geofence 620 in the first direction 625.

According to an example embodiment, the one or more parameters are a plurality of parameters and at least one parameter of the plurality of parameters may be indicative of the position of the mobile device.

Figure 7:
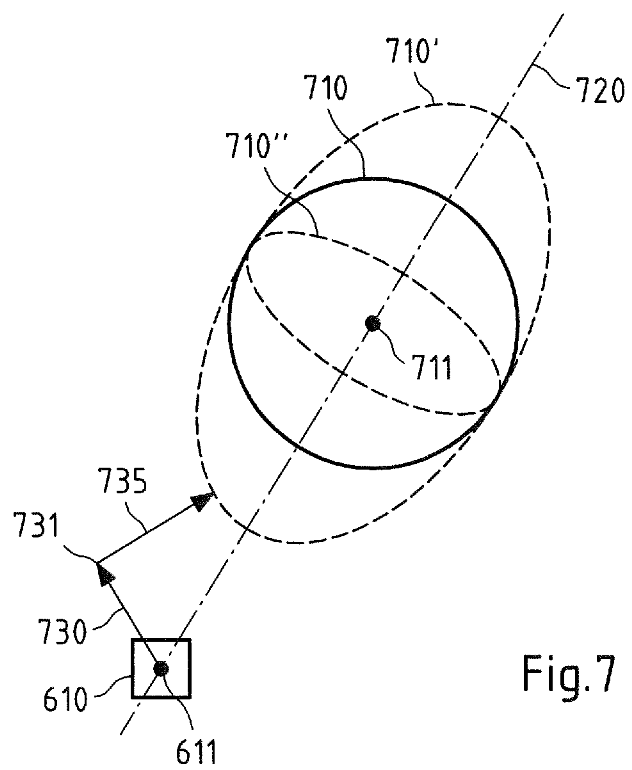

For instance, as exemplarily shown in FIG. 7, the position of the mobile device 610 is represented by point 611. Accordingly, the representative of a size of a geofence may be determined (e.g. in action 210 or action 510) based on one or more parameters, the one or more parameters are a plurality of parameters, and wherein at least one parameter of the plurality of parameters is indicative of a location update interval associated with a mobile device and at least one parameter of the plurality of parameters may be indicative of the position of the mobile device. For instance, said determining a representative of a size of a geofence may further be based on a position of the geofence 710, e.g. a predefined point in the area defined by the geofence, e.g. the centre 711 of the geofence.

As an example, a direction 720 (or axis 720) between the geofence 710 and the position 611 of the mobile device 610 may be determined (a direction 720 (or axis 720) between the position of the geofence 710 and the position 611 of the mobile device 610 may be determined), wherein this direction 720 may be an axis 720 through the position 611 of the mobile device 610 and through a predefined point within the area 710 defined by the geofence 710, wherein this predefined point may be the centre 711 of the geofence 710.

Then, for instance, in action 210 or in action 510, the determined representative of a size of the geofence is representative of a size of the geofence 710 in this determined direction 720. In particular, this may hold if the size of a geofence is indicative of an extension (or length) of the geofence 710 in a first direction (e.g. in exactly one direction) 720.

Thus, as an example, if the mobile device 610 at the time when position 611 is determined moves into a direction 730 leading away from geofence 710, and when mobile device 610 changes its movement direction at point 731 such that mobile device 710 then moves into a direction 735 leading towards the geofence 710, this may be at least partially anticipated by taking into account the at least one parameter being indicative of the position 611 of the mobile device when determining the representative of a size of the geofence 710 in action 210 of method 200 or in action 510 of method 500 based on the at least one parameter being indicative of the location update interval associated with the mobile device 610 and based on the at least one parameter being indicative of the position 611 of the mobile device 610, and, optionally, based on at least one further parameter.

For instance, if the location update interval associated with the mobile device 610 is getting longer this may lead to an increase of the size of the geofence 710 in the direction 720, wherein the direction 720 is determined based on the at least one parameter being indicative of the position 611 of the mobile device 610, e.g. by means of method 500 and by action 530, such that an increased geofence 710' is generated, which may lead to an increased probability that mobile device 610 is detected when it is in the geofence 710' compared to the previous geofence 710.

Or for instance, if the location update interval associated with the mobile device 610 is getting shorted this may lead to a decrease of the size of the geofence 710 in the direction 720, wherein the direction 720 is determined based on the at least one parameter being indicative of the position 611 of the mobile device 610, e.g. by means of method 500 and by action 540, such that a decreased geofence 710' is generated. Then, if the mobile device 610 should move to the center 711 of the geofence it can still be probably detected due to the short location update rate.

It has to be understood that elliptic geofence 710, 710', 710" is just an example and that any other well-suited geofence, e.g. a polygon geofence could be used.

According to an example embodiment, the one or more parameters are a plurality of parameters and at least one parameter of the plurality of parameters being indicative of a speed of the mobile device.

For instance the speed of the mobile device 510, 610 may be determined based on previous location estimates of the mobile device 510, 610 and their timestamps, i.e., each location estimate of the mobile device 510, 610 may be associated with a respective time stamp being indicative of the time when the location (or position) of the mobile device 510, 610 was determined or measured or calculated. And/or, the speed of the mobile device 510, 610 may be determined otherwise, e.g. from GNSS, e.g. GPS or the like or based on an optional speed sensor of the mobile device or associated with the mobile device 510, 610, wherein, as a non-limiting example, the speed sensor may measure the speed of a tire of a vehicle associated with the mobile device 510, 620.

For instance, the higher the speed indicated by the at least one parameter being indicative of a speed of the mobile device, the larger the size of the geofence may be determined in action 210 or 510, and/or, for instance, the slower the speed indicated by the at least one parameter being indicative of a speed of the mobile device, the shorter the size of the geofence may be determined in action 210 or 510. As an example, in particular this may hold if the remaining parameter(s) of the plurality of parameter are constant or are substantially constant, wherein the remaining parameter(s) at least comprises the at least one parameter being indicative of a location update interval associated with the mobile device. However, for instance, even if the remaining parameter(s) may also vary at least partially, the speed indicated by the at least one parameter being indicative of a speed of the mobile device may have the above described influence on the size of the geofence, i.e., the higher speed indicated by the at least one parameter being indicative of a speed of the mobile device, the larger the size of the geofence may be determined in action 210 or 510, and/or, for instance, the slower the speed indicated by the at least one parameter being indicative of a speed of the mobile device, the shorter the size of the geofence may be determined in action 210 or 510.

As an example embodiment, said determining a representative of a size of a geofence, e.g. in action 210 or 510, may comprise at least one of: (i) determining a larger size in case that the at least one parameter indicative of a location update interval indicates a longer location update interval as compared to when the at least one parameter indicative of a location update interval indicates a shorter location update interval, (ii) determining a smaller size in case that the at least one parameter indicative of a location update interval indicates a shorter location update interval as compared to when the at least one parameter indicative of a location update interval indicates a longer location update interval, (iii) determining a larger size in case that the at least one parameter indicative of a speed of the mobile device indicates a faster speed as compared to when the at least one parameter indicative of a speed of the mobile device indicates a slower speed, and (iv) determining a smaller size in case that the at least one parameter indicative of a speed of the mobile device indicates a slower speed as compared to when the at least one parameter indicative of a speed of the mobile device indicates a higher speed.

As an example embodiment, said determining a representative of a size of a geofence, e.g. in action 210 or 510, may be based on a function, wherein the location update interval indicated by the at least one parameter indicative of a location update interval is an input to this function and the speed of the mobile device indicated by the at least one parameter indicative of a speed of the mobile device is an input to this function, wherein the size of the geofence is an output of this function, and wherein, at least in a predefined range:

the function is monotonically increasing or strictly increasing with respect to the location update interval as input if the speed as input is kept constant, and the function is monotonically increasing or strictly increasing with respect to the speed as input if the location updated interval is kept constant.

For instance, this function may be represented by f2(u,v), wherein u is a value of the location update interval indicated by the at least one parameter indicative of a location update interval associated with the mobile device and v is a value of the speed of the mobile device indicated by the at least one parameter indicative of a speed of the mobile device, and the output of the function f2(u,v) may be denoted as s, wherein s=f2(u,v) holds, and wherein s is the representative of a size of a geofence. Thus, function f2(u,v) may be used to determine the size of a geofence 310, 320, 330 in action 210 and/or 510.

For instance, function f2 may be, at least in a predefined range, monotonically increasing with respect to u as input, i.e., with respect to the location update interval u associated with the mobile device as input, if the speed v is kept constant, i.e., the following may hold:

s1=f2(u1,v=const) s2=f2(u2,v=const), if u1>u2, and s1=f2(u1,v=const) s2=f2(u2,v=const), if u2>u1, wherein this may hold at least in predefined range of $u_{low}<u<u_{max}$ and/or for a predefined range $s=f2(u,v)>s_{min}$ and/or $s=f2(u,v)<s_{max}$.

Or, as another example, function f2 may be, at least in a predefined range, strictly increasing with respect to u as input, i.e., with respect to the location update interval u associated with the mobile device as input, if the speed v is kept constant, i.e., the following may hold:

$s1=f2(u1,v=const)>s2=f2(u2,v=const)$, if $u1>u2$, and $s1=f2(u1,v=const)<s2=f2(u2,v=const)$, if $u2>u1$, wherein this may hold at least in predefined range of $u_{low}<u<u_{max}$ and/or for a predefined range $s=f2(u,v)>s_{min}$ and/or $s=f2(u,v)<s_{max}$.

For instance, function f2 may be, at least in a predefined range, monotonically increasing with respect to v as input, i.e., with respect to the speed of the mobile device, if the location update interval u is kept constant, i.e., the following may hold:

$s1=f2(v1,u=const)\ s2=f2(v2,u=const)$, if $v1>v2$, and $s1=f2(v1,u=const)\leq s2=f2(v2,u=const)$, if $v2>v1$, wherein this may hold at least in predefined range of $u_{low}<u<u_{max}$ and/or for a predefined range $s=f2(u,v)>s_{min}$ and/or $s=f2(u,v)<s_{max}$.

Or, as another example, function f2 may be, at least in a predefined range, strictly increasing with respect to v as input, i.e., with respect to the speed of the mobile device, if the location update interval u is kept constant, i.e., the following may hold:

$s1=f2(v1,u=const)>s2=f2(v2,u=const)$, if $v1>v2$, and $s1=f2(v1,u=const)<s2=f2(v2,u=const)$, if $v1<v2$, wherein this may hold at least in predefined range of $u_{low}<u<u_{max}$ and/or for a predefined range $s=f2(u,v)>s_{min}$ and/or $s=f2(u,v)<s_{max}$.

As an example, function f2 may process at least on further input parameter in addition to the location update interval u.

Furthermore, as an example, the representative of a size of a geofence may be determined in action 210, in particular in at least a part of a predefined range, to be (substantially) proportional to an location update interval indicated by the at least one parameter indicative of a location update interval of the mobile device.

Thus, for instance, if said function f2 is applied to determine the representative of a size of a geofence, then, in at least a part of the predefined range, $f2=const*u*v$ may hold, wherein const may represent a constant, or, $f1=const*u*v+const2$ may hold, wherein const2 may represent a second constant defining an offset $const2>0$, such that the size of the geofence is not determined to be approximately zero in case the location update interval is very fast and/or the speed of the mobile device v is very slow, i.e., u nearby or equal to zero and/or v nearby or equal to zero.

As an example embodiment, said determining a representative of a size of a geofence, e.g. in action 210 or action 510, may be based on a function, wherein an input parameter is an input to this function, wherein the size of the geofence is an output of this function, and wherein the input parameter is determined based on the location update interval indicated by the at least one parameter indicative of a location update interval is an input to this function and based on the speed of the mobile device indicated by the at least one parameter indicative of a speed of the mobile device, and wherein, at least in a predefined range, the output of the function is monotonically increasing or strictly increasing with respect to the input parameter.

For instance, this function may be represented by f3(i), wherein value i is an input parameter acting as an input to this function f3, wherein the size of the geofence is an output of this function, i.e. $s=f3(i)$, in particular at least in a predefined range.

The input parameter i is determined based on the location update interval u indicated by the at least one parameter indicative of a location update interval and based on the speed v of the mobile device indicated by the at least one parameter indicative of a speed of the mobile device, i.e., i may be function depending on u and v. As an example, said input parameter i may depend on the speed v of the mobile device and on the location update interval u associated with the mobile device in such a way that at least one of the following holds: (i) parameter i is determined to be larger in case that location update interval u indicates a longer location update interval as compared to when the location update interval u indicates a shorter location update interval, (ii) parameter i is determined to be smaller in case that location update interval u indicates a shorter location update interval as compared to when the location update interval u indicates a longer location update interval, (iii) parameter i is determined to be larger in case that the at least one parameter indicative of a speed of the mobile device indicates a faster speed as compared to when the at least one parameter indicative of a speed of the mobile device indicates a slower speed, and (iv) parameter i is determined to be smaller in case that the at least one parameter indicative of a speed of the mobile device indicates a slower speed as compared to when the at least one parameter indicative of a speed of the mobile device indicates a higher speed.

For instance, function f3 may be, at least in a predefined range, monotonically increasing with respect to i as input, i.e., the following may hold:

$s1=f3(i1)\ s2=f3(i2)$, if $i1>i2$, and $s1=f3(i1)\ s2=f3(i2)$, if $i1<i2$, wherein this may hold at least in predefined range of $i_{low}<i<i_{max}$ and/or for a predefined range $s=f3(i)>s_{min}$ and/or $s=f3(i)<s_{max}$.

For instance, function f3 may be, at least in a predefined range, strictly increasing with respect to i as input, i.e., the following may hold:

$s1=f3(i1)>s2=f3(i2)$, if $i1>i2$, and $s1=f3(i1)<s2=f3(i2)$, if $i1<i2$, wherein this may hold at least in predefined range of $i_{low}<i<i_{max}$ and/or for a predefined range $s=f3(i)>s_{min}$ and/or $s=f3(i)<s_{max}$.

As an example, the input parameter i may be determined based on a multiplication of the location update interval indicated by the at least one parameter indicative of a location update interval is an input to this function and the speed of the mobile device indicated by the at least one parameter indicative of a speed of the mobile device. Thus, for instance, $i=u*v$ may hold, or, for instance, $i=const*u*v$ may hold, wherein const may be any well-suited constant, or, for instance, $i=const*u*v+const2$ may hold, wherein const2 may represent a further constant defining a kind of offset.

Furthermore, as an example, the input parameter i may be determined based on a multiplication of the location update interval indicated by the at least one parameter indicative of a location update interval is an input to this function and the speed of the mobile device indicated by the at least one parameter indicative of a speed of the mobile device. Thus, for instance, $i=u+v$ may hold.

Furthermore, as an example, the representative of a size of the geofence is s, and the at least one parameter indicative of a location update interval is u, and the at least one parameter indicative of the speed of the mobile device is v, and wherein, at least in a predefined range, s=const*u*v holds, wherein const is a constant.

For instance, as a non-limiting example, the geofence may be a circular geofence and the representative of a size of the geofence is a radius of the circular geofence, wherein the predefined range at last partially depends on a predefined radius r_original, and wherein s=arg_max (r_original, constant*v*u) holds. Thus, it can be ensured that the determined size of the geofence is not lower than the predefined radius r_original. E.g., s may be the radius of the determined (or adjusted) geofence, e.g. in [m], r_original may be in [m], constant may be an arbitrary constant without unit, wherein, an example, a default value of const may be const=0.5 (but however any other well-suited default value could be chosen), and v is the speed of the mobile device, e.g. in [m/s], and u may by the location update interval in [s].

As an example, the predefined range which may be applied when determining a representation of a size of the geofence may define a predefined lower bound of the size of the geofence, e.g. as the above-mentioned r_original or as the above mentioned s_min, such that the determined representation of a size of the geofence does not fall below the predefined lower bound and/or may define a predefined upper bound s_max of the size of the geofence, e.g. as the above-mentioned s_max, such that the determined representation of a size of the geofence does not exceed the upper bound. For instance, said one or more parameters used as basis for determining a size of the geofence in action 210 or 510 may be a plurality of parameters, wherein at least one parameter of the plurality of parameters is indicative of the predefined range which may comprise a predefined lower bound of the size of the geofence and/or a predefined upper bound of the size of the geofence The predefined range may be determined or may be received in response to a user input and may ensure that the determined size of the geofence will not be too small (e.g. based on the lower bound) and/or will not be too big (e.g. based on the upper bound.

According to an example, said reference geofence and/or the previous geofence may be obtained based on a user input.

According to an example, said one or more parameters used as basis for determining said representative of a size of a geofence (e.g. in action 210 or action 510) may represent a plurality of parameters, wherein at least one parameter of said plurality of parameters is indicative of further information, in particular information related to a position of the mobile device.

For instance, said further information may include information regarding one or more speed limits which might be associated with one or more roads being within the geofence. Thus, as an example, if the speed v of the mobile device is higher than the maximum speed limit (v_limit_max) of the one or more speed limits the speed v or higher than c2*v_limit_max (with c2 being a constant>1, e.g. 1.1, or 1.2, or any other well-suited value), then the speed v of the mobile device which is used as input to a function in order to determine the size of a geofence, e.g. as explained to any of the preceding examples, may be set to the maximum speed limit v_limit or may be set to a c1*v_limit_max since (wherein c1 is a constant>1 and, e.g., c1=c2 may hold) it may be assumed that the mobile device, when entering the geofence, may reduce its speed (at least partially) in accordance with the speed limit inside the geofence.

According to an example, said apparatus 100 may be or may be part of the mobile device or a server of a positioning support system or a hub of said positioning support system.

Figure 8:
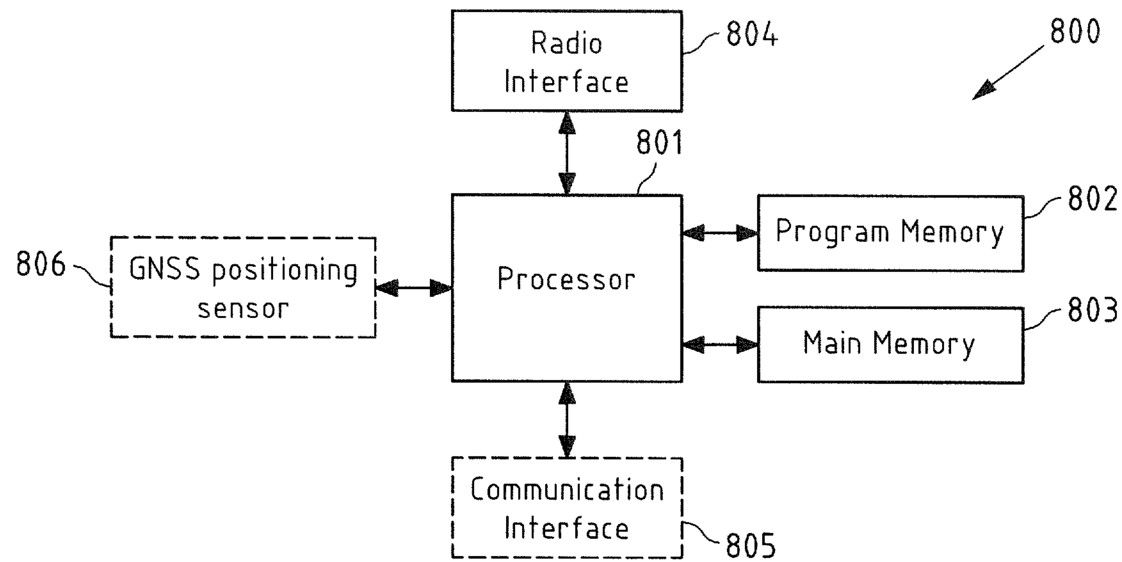
FIG. 8 is a block diagram of an exemplary embodiment of an apparatus according to the invention.

FIG. 8 is a block diagram of an exemplary embodiment of an apparatus in form of a mobile device 800 according to the invention. For instance, the mobile device 800 may be any of the previously mentioned mobile devices and/or movable devices, e.g. mobile device 610. Furthermore, and/or, as an example, mobile device 800 may be configured to perform any of the method 200, 500, 500' and, in this case, mobile device 800 may represent an implementation of apparatus 100 of FIG. 1. For example, mobile device 800 may be one of a smartphone, a tablet computer, a notebook computer, a smart watch and a smart band. For instance, mobile device 800 may be considered to be part or at least carried by a vehicle, e.g. a car or a truck or any other well-suited vehicle.

Mobile device 800 comprises a processor 801. Processor 801 may represent a single processor or two or more processors, which are for instance at least partially coupled, for instance via a bus. Processor 801 executes a program code stored in program memory 802 (for instance program code causing mobile device 800 to perform one or more of the embodiments of a method according to the invention or parts thereof (e.g. the method or parts of the method described below with reference to FIGS. 2, 5*a* and 5*b*), when executed on processor 801), and interfaces with a main memory 803. Program memory 802 may also contain an operating system for processor 801. Some or all of memories 802 and 803 may also be included into processor 801.

One of or both of a main memory and a program memory of a processor (e.g. program memory 802 and main memory 803 and/or program memory 802 and main memory 803 as described below with reference to FIG. 9) could be fixedly connected to the processor (e.g. processor 801 and/or processor 901) or at least partially removable from the processor, for instance in the form of a memory card or stick.

A program memory (e.g. program memory 802 and/or program memory 902 as described below with reference to FIG. 9) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 803 and/or main memory 903 as described below with reference to FIG. 9) may for instance be a volatile memory. It may for instance be a DRAM memory, to give non-limiting example. It may for instance be used as a working memory for processor 801 when executing an operating system and/or programs.

Processor 801 further controls a radio interface 804 configured to receive and/or output data and/or information. For instance, radio interface 804 may be configured to receive radio signals from a radio node. The radio interface 804 is configured to scan for radio signals that are broadcast by radio nodes, e.g. based an WiFi (WLAN) or a Bluetooth or any other radio communications system. Furthermore, the radio interface 804 may be configured for evaluating (e.g. taking measurements on the received radio signals like measuring a received signal strength) and/or extracting data or information from the received radio signals. It is to be understood that any computer program code based processing required for receiving and/or evaluating radio signals may be stored in an own memory of radio interface 804 and executed by an own processor of radio interface 804 or it may be stored for example in memory 803 and executed for example by processor 801.

For example, the radio interface 804 may at least comprise a BLE and/or Bluetooth radio interface including at least a BLE receiver (RX). The BLE receiver may be a part of a BLE transceiver. It is to be understood that the invention is not limited to BLE or Bluetooth. For example, radio interface 204 may additionally or alternatively comprise a WLAN radio interface including at least a WLAN receiver (RX). The WLAN receiver may also be a part of a WLAN transceiver.

Moreover, for instance, processor 801 may control a further communication interface 805 which is for example configured to communicate according to a cellular communication system like a 2G/3G/4G/5G cellular communication system. Mobile device 800 may use communication interface 805 to communicate with a server, e.g. with server 900 depicted in FIG. 9.

Furthermore, processor 801 may control an optional GNSS positioning sensor 806 (e.g. a GPS sensor or any other GNSS positioning techniques previously mentioned). GNSS positioning sensor may be configured to receive satellite signals of a GNSS system (e.g. GPS satellite signals) and to determine a position of the mobile device (e.g. a current position of the mobile device) at least partially based on satellite signals of the GNSS system that are receivable at this position.

The components 802 to 806 of mobile device 800 may for instance be connected with processor 801 by means of one or more serial and/or parallel busses.

It is to be understood that mobile device 800 may comprise various other components. For example, mobile device 800 may optionally comprise a user interface (e.g. a touch-sensitive display, a keyboard, a touchpad, a display, etc.) or one or more inertial sensors (e.g. an accelerometer, a gyroscope, a magnetometer, a barometer, etc.). For instance, said user interface may be configured to receive a user input for defining a reference geofence and/or a previous geofence, and/or to receive a user input for defining a predefined range. For instance, a user may define a reference geofence around an area-of-interest, wherein this reference geofence around an area-of-interest may be considered to represent a previous geofence for determining a size of the geofence in action 210 or 510 and/or, in particular, for adjusting a size of this geofence in action 515 of FIG. 5*a*.

For instance, said mobile device 800 may process the geofence and may track its position in order to provide a notification when the mobile device is within the boundaries of the geofence, wherein a size of geofence is determined according to action 210 and 510 and may be adjusted according to methods 500 and 500' of FIGS. 5*a* and 5*b*. For instance, said notification is provided via the user interface in order to notify a user that the mobile device is now within the geofence.

Figure 9:
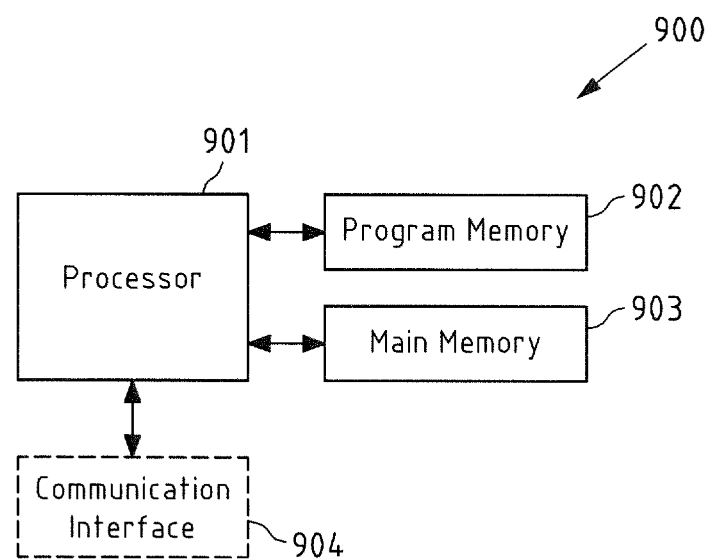
FIG. 9 is a block diagram of another exemplary embodiment of a server according to the invention.

FIG. 9 is a block diagram of an exemplary embodiment of a server 900, which may be a server 900 in a positioning support system or any other server, e.g. at a server of an Internet of Things (IoT) cloud.

For instance, said server 900 of the positioning support system may provide and/or process at least one geofence and may track the position of one or more mobile devices, e.g. mobile device 610 and/or mobile device 800, in order to send a notification when a mobile device is within the boundaries of a geofence of the at least one geofence, wherein a size of a geofence of each of at least one geofence of the at least one geofence is determined according to action 210 and 510 and may be adjusted according to methods 500 and 500' of FIGS. 5*a* and 5*b*. For instance, said notification is provided via a communication system, e.g. via a cellular communication system like a 2G/3G/4G/5G to mobile device 800 (or mobile device 610) such that the notification may be provided to a user of the mobile device via the user interface of mobile device 800.

Server 900 comprises a processor 901. Processor 901 may represent a single processor or two or more processors, which are for instance at least partially coupled, for instance via a bus. Processor 901 executes a program code stored in program memory 902 (for instance program code causing server 900 to perform one or more of the embodiments of a method according to the invention or parts thereof (e.g. the method or parts of the method described below with reference to FIG. 2, 5*a* or 5*b*, when executed on processor 901), and interfaces with a main memory 903.

Program memory 902 may also comprise an operating system for processor 901. Some or all of memories 902 and 903 may also be included into processor 901.

Moreover, processor 901 controls a communication interface 904 which is for example configured to communicate according to a cellular communication system like a 2G/3G/4G/5G cellular communication system. Server 900 may use communication interface 904 to communicate with mobile devices 610, 800.

The components 302 to 304 of server 900 may for instance be connected with processor 901 by means of one or more serial and/or parallel busses.

It is to be understood that server 900 may comprise various other components. For example, indoor radio positioning server 900 may optionally comprise a user interface (e.g. a touch-sensitive display, a keyboard, a touchpad, a display, etc.). For instance, said user interface may be configured to receive a user input for defining a reference geofence and/or a previous geofence, and/or to receive a user input for defining a predefined range.

Figure 10:
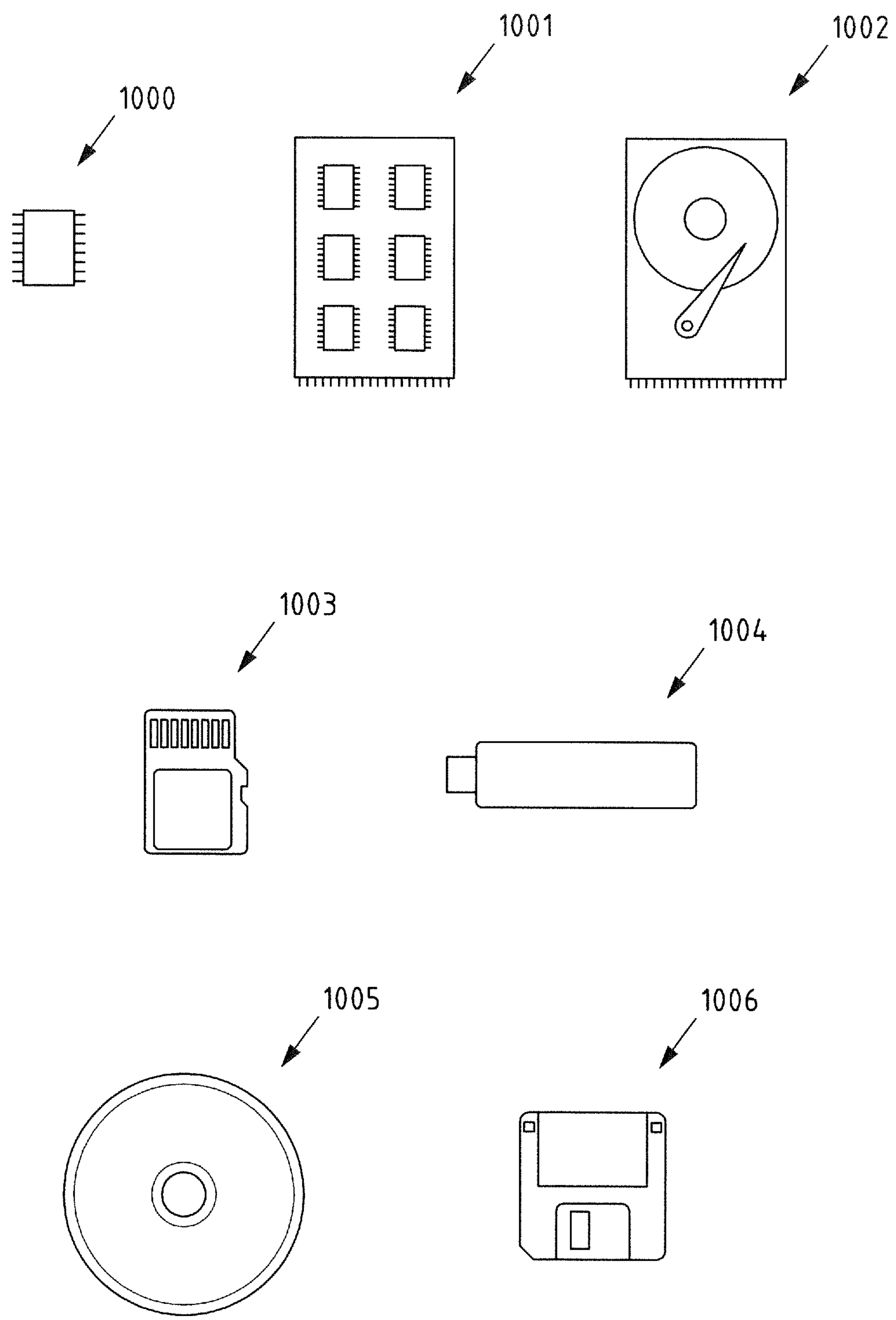
FIG. 10 is a schematic illustration of examples of tangible and non-transitory storage media according to the invention.

FIG. 10 is a schematic illustration of examples of tangible and non-transitory computer-readable storage media according to the present invention that may for instance be used to implement program memory 102 of FIG. 1 or memory 802 of FIG. 8 or memory 902 of FIG. 9.

To this end, FIG. 10 displays a flash memory 1000, which may for instance be soldered or bonded to a printed circuit board, a solid-state drive 1001 comprising a plurality of memory chips (e.g. Flash memory chips), a magnetic hard drive 1002, a Secure Digital (SD) card 1003, a Universal Serial Bus (USB) memory stick 1004, an optical storage medium 1005 (such as for instance a CD-ROM or DVD) and a magnetic storage medium 1006.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 101, 801 and 901 of FIGS. 1, 8 and 9, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method performed by an apparatus, said method comprising:

determining a representative of a size of a geofence based on one or more parameters, wherein at least one parameter of the one or more parameters is indicative of a location update interval associated with a mobile device and at least one other parameter of the one or more parameters is indicative of a speed of the mobile device, wherein said determining a representative of a size is based on a function, wherein the location update interval indicated by the at least one parameter is an input to the function and the speed of the mobile device indicated by the at least one other parameter is an input to the function, wherein the size of the geofence is an output of the function, and wherein, at least in a predefined range:

the function is configured to increase with respect to the location update interval increasing if the speed is kept constant, and the function is configured to increase with respect to the speed increasing if the location updated interval is kept constant.

2. The method according to claim 1, wherein said determining a representative of a size of a geofence comprises at least one of:

determining a first size in case that the at least one parameter indicative of a location update interval indicates a location update interval in a first time range defined by a first minimum time and a first maximum time;

determining a second size, which is smaller than the first size, in case that the at least one parameter indicative of a location update interval indicates a location update interval in a second time range defined by a second minimum time and a second maximum time, wherein the second maximum time is less than the first minimum time;

determining a third size, which is larger than the first size, in case that the at least one parameter indicative of a location update interval indicates a location update interval in a third time range defined at least in part by a third minimum time, wherein the third minimum; time is greater than the first maximum time; and determining a fourth size, which is smaller than the second size, in case that the at least one parameter indicative of a location update interval indicates a location update interval in a fourth time range defined at least in part by a fourth maximum time, wherein the fourth maximum time is less than the second minimum time.

3. The method according to claim 1, wherein said predefined range is defined by at least one of a lower bound of the size of the geofence or an upper bound of the size of the geofence.

4. The method according to claim 1, wherein the one or more parameters are a plurality of parameters, and wherein at least one parameter of the plurality of parameters is indicative of a direction of movement associated with the mobile device.

5. The method according to claim 4, wherein said determined representative of a size of the geofence is representative of a size of the geofence in a direction which is substantially the same as the direction of movement associated with the mobile device indicated by the respective at least one parameter of the plurality of parameters.

6. The method according to claim 1, wherein the one or more parameters are a plurality of parameters, and wherein at least one parameter of the plurality of parameters is indicative of the position of the mobile device.

7. The method according to claim 6, wherein said determined representative of a size of the geofence is representative of a size of the geofence in a direction between a center point of the geofence and the position of the mobile device indicated by the at least one parameter being indicative of the position of the mobile device.

8. The method according to claim 4, comprising changing or modifying a shape associated with the geofence compared to a shape associated with a reference geofence or with a previous geofence.

9. The method according to claim 1, comprising maintaining a shape associated with the geofence compared to a shape associated with a reference geofence or with a previous geofence.

10. The method according to claim 1, wherein said determining a representative of a size of a geofence comprises at least one of:

determining a first size in case that the at least one parameter indicative of a speed of the mobile device indicates the speed of the mobile device is within a first speed range defined by a first minimum speed and a first maximum speed, determining a second size, which is smaller than the first size, in case that the at least one parameter indicative of a speed of the mobile device indicates the speed of the mobile device is within a second speed range defined by a second minimum speed and second maximum speed, the second maximum speed being less than the first minimum speed, determining a third size, which is larger than the first size, in case that the at least one parameter indicative of a speed of the mobile device indicates the speed of the mobile device is within a third range defined at least in part by a third minimum speed that is larger than the first maximum speed, and determining a fourth size, which is smaller than the second size, in case that the at least one parameter indicative of a speed of the mobile device indicates the speed of the mobile device is within a fourth range defined at least in part by a fourth maximum speed that is less than the second minimum speed.

11. The method according to claim 1, wherein the function is linear with respect to at least one input to the function or with respect to a combination of inputs to the function.

12. The method according to claim 1, wherein the function is a function of a multiplication of the location update interval indicated by the at least one parameter indicative of a location update interval and the speed of the mobile device indicated by the at least one parameter indicative of a speed of the mobile device.

13. The method according to claim 1, wherein the representative of a size of the geofence is s, and the at least one parameter indicative of a location update interval is u, and the at least one parameter indicative of the speed of the mobile device is v, and wherein, at least in a predefined range, s=const*u*v holds, wherein const is a constant.

14. The method according to claim 13, wherein the geofence is a circular geofence and the representative of a size of the geofence is a radius of the circular geofence, wherein the predefined range at last partially depends on a predefined radius r_original, and wherein s equals the larger of (r_original, constant*v*u) holds.

15. The method according to claim 1, wherein a predefined range is applied when determining a representation of a size of the geofence such that the size of the determined representation of a size of the geofence is within the predefined range, wherein, in particular, the predefined range may define a lower bound of the size of the geofence.

16. The method according to claim 1, wherein said one or more parameters represent a plurality of parameters, and wherein at least one parameter of said plurality of parameters is indicative of further information, in particular information related to a position of the mobile device.

17. A non-transitory computer readable storage medium in which computer program code is stored, the computer program code when executed by a processor causing at least one apparatus to:

determine a representative of a size of a geofence based on one or more parameters, wherein at least one parameter of the one or more parameters is indicative of a location update interval associated with a mobile device and at least one other parameter of the one or more parameters is indicative of a speed of the mobile device, wherein said determining a representative of a size is based on a function, wherein the location update interval indicated by the at least one parameter is an input to the function and the speed of the mobile device indicated by the at least one other parameter is an input to the function, wherein the size of the geofence is an output of the function, and wherein, at least in a predefined range:

the function is configured to increase with respect to the location update interval increasing if the speed is kept constant, and the function is configured to increase with respect to the speed increasing if the location updated interval is kept constant.

18. An apparatus, said apparatus comprising at least one processor and at least one memory including computer program code, the at least one memory and the computer program code configured to, with the at least one processor, cause said apparatus at least to:

determine a representative of a size of a geofence based on one or more parameters, wherein at least one parameter of the one or more parameters is indicative of a location update interval associated with a mobile device and at least one other parameter of the one or more parameters is indicative of a speed of the mobile device, wherein said determining a representative of a size is based on a function, wherein the location update interval indicated by the at least one parameter is an input to the function and the speed of the mobile device indicated by the at least one other parameter is an input to the function, wherein the size of the geofence is an output of the function, and wherein, at least in a predefined range:

the function is configured to increase with respect to the location update interval increasing if the speed is kept constant, and the function is configured to increase with respect to the speed increasing if the location updated interval is kept constant.

* * * * *

UNITED STATES PATENT AND TRADEMARK OFFICE

CERTIFICATE OF CORRECTION

PATENT NO. : 11,388,548 B2
APPLICATION NO. : 16/982440
DATED : July 12, 2022
INVENTOR(S) : Lauri Wirola et al.

It is certified that error appears in the above-identified patent and that said Letters Patent is hereby corrected as shown below:

In the Claims

In Column 28, Line 38, Claim 2, delete “minimum;” and insert -- minimum --, therefor.

Signed and Sealed this
Twenty-second Day of August, 2023

Katherine Kelly Vidal

Katherine Kelly Vidal
*Director of the United States Patent and Trademark Office*